Aug. 14, 1951 J. FRANKEN 2,564,399
CLOSURE MEANS FOR ARTIFICIAL RECTAL OPENINGS
Filed Jan. 26, 1949
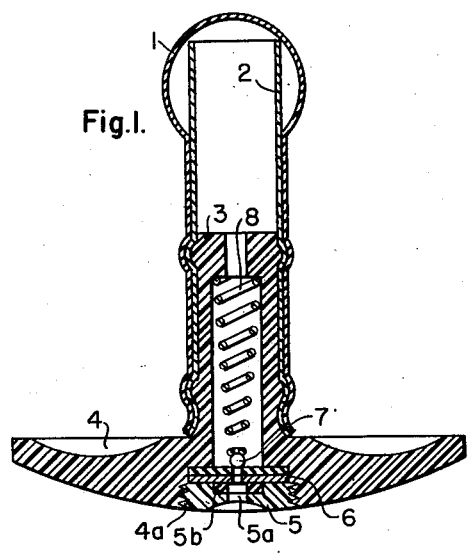
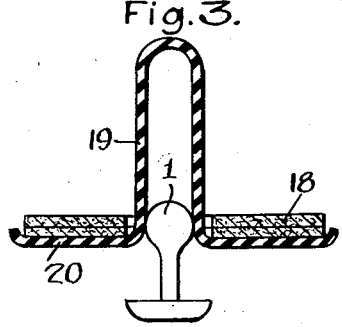
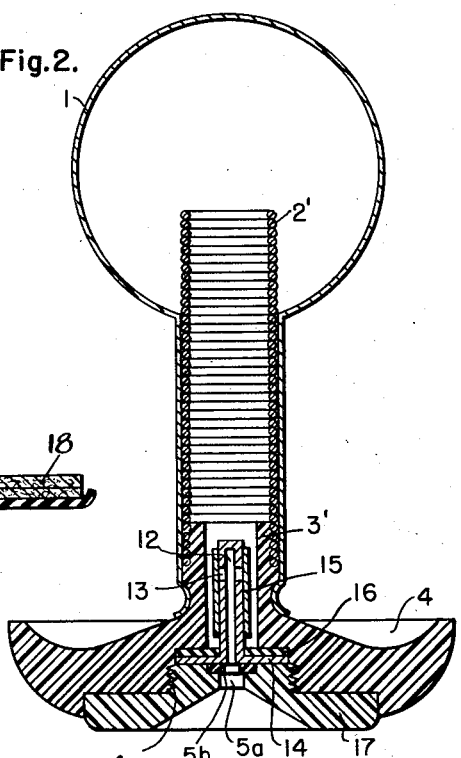
INVENTOR.
Joseph Franken.
BY
ATTORNEY Patented Aug. 14, 1951

2,564,399

UNITED STATES PATENT OFFICE 2,564,399

CLOSURE MEANS FOR ARTIFICIAL RECTAL OPENINGS

Josef Franken, Trelleborg, Sweden

Application January 26, 1949, Serial No. 72,923
In Sweden January 28, 1948

4 Claims. (Cl. 128—283)

My invention relates to means for closing an artificial rectal opening and has for its main object to provide devices that permit controlling the rectal discharges at the will of the patient.

In connection with certain diseases, it occurs that the lowermost portion of the rectum is removed by operation and an artificial rectal opening is provided, generally in the abdominal wall. Such an opening, of course does not have a sphincter like that of the natural rectum opening. Hence, the purgations of the rectum cannot be stopped at the will of the patient, but may come about on unexpected and unsuitable occasions. The remedies hitherto known were limited to the application of collecting means outside the rectal opening. A pneumatically inflatable closure device functioning as a gas tight stopper has also become known.

According to the invention, the obvious disadvantages of the known devices are obviated by a closure means principally consisting of an expansible bladder which is soft in its non-inflated condition and adapted to be introduced in this condition through the artificial rectal opening and to be inflated upon introduction. The bladder is provided with a semi-elastic supporting means and connected to a neck of a base plate. The bladder is kept closed in its inflated condition by valve means affording an automatic tightening effect against the pressure of the contents of the rectum, so that the inflated rubber bladder is caused to close the rectal opening until the air is permitted to escape from the bladder by releasing the same or some other tightening device when the closure means is to be removed from the rectal opening.

The accompanying drawing illustrates two embodiments of the invention in section and on an enlarged scale. Fig. 1 shows a device with one valve and Fig. 2 a device with two valves. Fig. 3 shows a finger sleeve to be used with such a device.

According to Fig. 1, a rubber bladder 1, shown somewhat inflated, is thrust, together with a semi-elastic tube 2, onto a neck portion 3 of a base plate 4, which consists of rubber, plastic, wood or similar material. A tightening disk 6, consisting of a rubber washer or the like glued onto a metal washer, is screwed by means of a bottom screw 5 into a threaded recess 4a in the base plate. A ball 7 provides, together with a spring 8, a check valve for tightening the rubber bladder.

An ordinary rubber ball of a douching bottle, for example, serves to fill the rubber bladder with air. The ball is preferably provided with a special nozzle which, when pressed firmly into the recess 5a of the bottom screw 5, is tightened against the outside by means of a loosely inserted rubber ring 5b, while ball 7 is lifted from the tightening disk 6. To empty the rubber bladder, it is sufficient to press the same nozzle loosely against the ball 7, in a manner such that the tightening effect of the ball 7 as well as of the nozzle is relieved. The air in the rubber bladder 1 may also be caused to escape by means of an arbitrary rod, such as a match, a pencil or the like, the pressure of the rectum then causing complete excretion.

The neck portion 3 is preferably made in such manner that the rubber bladder 1 can be thrust over the neck portion for a shorter or longer distance, whereby the distance between the rubber bladder and the abdominal wall of the patient may be adapted to the thickness of the abdominal wall.

According to Fig. 2, the closure means is provided with two valves, the supporting means of the rubber bladder 1 consisting here of a spring 2' which is thrust onto a neck portion 3' on the base plate 4. The valve device 12 comprises a valve tube closed at its inner end and having two or more lateral openings 13, a tightening disk 14, a rubber tightening tube 15 thrust over the lateral openings 13, and a rubber washer 16 cemented on the tightening surface 14 of the valve tube. The valve device 12 is retained either resiliently or by means of an attaching device 17 which is shown as a screw member but may also be given a bayonet- or lever-type design.

An injection syringe with a free return movement serves for filling the rubber bladder with air after the bladder has been introduced into the artificial rectal opening. When the plunger of the syringe, which is pressed with the nozzle against the outer end of the valve device 12, is moved downwardly, the air finds its way into the rubber bladder 1 through the lateral openings 13 of the valve, which automatically ensures that the air does not flow back. The air in the rubber bladder is let out by loosening of the attaching device 17, whereby the tightening effect against the rubber disk 16 is relieved.

To prevent the moisture of the rectal mucus from reaching the underwear and from affecting the closure apparatus proper, the latter is preferably used in combination with a finger sleeve as shown in Fig. 3. The finger sleeve consists of a finger 19 and a plate 20 of thin rubber. Prior to being introduced into the rectum the sleeve is put over the bladder 1 of the closure apparatus, and according to the invention said sleeve is inflated simultaneously with the bladder. The plate 20 of the finger sleeve may be kept spread over the body with a rubber band above and another rubber band below the base plate of the closure apparatus.

To absorb the rectal mucus, a suction plate 18 is placed between the plate of the sleeve and the body. The suction plate I is composed, according to the invention, of two different absorbing materials, one of which is hard and the other soft, the former consisting, for instance, of a dry cellulose mass and the other of cellulose wool.

In order to support the abdominal wall about the artificial rectal opening in its task of affording an abutment for the inflated bladder, the closure means according to the invention may be combined with a ring of some hard material, which is operatively introduced in a manner known per se inside the abdominal wall about the rectum, so that the rubber bladder will not be pressed out due to the pressure of the contents of the rectum.

What I claim is:

1. A closure device for an artificial rectal opening, comprising an elastic bladder soft when deflated and adapted to be then introduced through the rectal opening and to close said opening when thereafter inflated, a base plate having a neck portion, an elastically deflectable tubular member extending from said neck portion, said bladder being tightly secured to said neck portion around said tubular member, said plate having an air duct extending through said neck portion and communicating through said member with said bladder, and check valve means disposed in said duct and responsive to bladder pressure to permit inflating said bladder by applying air pressure to said duct, said check valve means being accessible to permit being released for deflating said bladder.

2. A closure device for an artificial rectal opening, comprising an elastic bladder soft when deflated and adapted to be then introduced through the rectal opening and to close said opening when thereafter inflated, a base plate having a neck portion, an elastically deflectable tubular member extending from said neck portion, said bladder having a tubular extension extending over said member and engaging said neck portion, said tubular extension being adapted to be thrust over said neck portion a desired distance to permit adjusting the position of said bladder relative to said plate, said plate having an air duct extending through said neck portion and communicating through said member with said bladder, and check valve means disposed in said duct and responsive to bladder pressure to permit inflating said bladder by applying air pressure to said duct, said check valve means being accessible to permit being released for deflating said bladder.

3. A closure device according to claim 1, comprising an elastic finger sleeve enclosing said bladder and plate to be inflated and deflated together with said bladder.

4. A closure device according to claim 1, comprising an elastic finger sleeve enclosing said bladder and plate to be inflated and deflated together with said bladder, and a ring-shaped absorption plate disposed about said sleeve so as to contact the patient's body.

JOSEF FRANKEN.

REFERENCES CITED

The following references are of record in the file of this patent:

UNITED STATES PATENTS

| Number | Name | Date |
|---|---|---|
| 2,324,520 | Lamson | July 20, 1943 |